United States Patent [19]

Greatorex et al.

[11] Patent Number: 4,712,946
[45] Date of Patent: Dec. 15, 1987

[54] ASSEMBLY AND INSTALLATION OF PIPES

[75] Inventors: Cyril B. Greatorex, Stapleford; Ian W. H. Smith, Allestree; Graham J. Hammersley, Awsworth, all of England

[73] Assignee: Stanton plc, Ilkeston, England

[21] Appl. No.: 831,823

[22] Filed: Feb. 24, 1986

[30] Foreign Application Priority Data

Mar. 1, 1985 [GB] United Kingdom ............... 8505315

[51] Int. Cl.$^4$ ............................................... F16L 1/00
[52] U.S. Cl. ................... 405/170; 405/159; 405/136; 405/169; 414/747
[58] Field of Search ............ 405/158, 159, 136, 168, 405/169, 170, 171, 135, 137; 211/119.03, 119.04; 414/747

[56] References Cited

U.S. PATENT DOCUMENTS

| | | | |
|---|---|---|---|
| 580,226 | 4/1897 | Sanford | 405/170 |
| 1,363,115 | 12/1920 | Helfrich | 405/136 X |
| 1,647,448 | 11/1927 | Jones | 405/159 X |
| 2,731,800 | 1/1956 | Collins | 405/171 X |
| 2,913,127 | 11/1959 | Lendick | 211/119.03 |
| 3,286,286 | 11/1966 | Nelson | 405/171 X |
| 3,466,881 | 9/1969 | Lamy | 405/166 |
| 3,515,414 | 6/1970 | Kowalewski | 405/158 X |

FOREIGN PATENT DOCUMENTS

| | | | |
|---|---|---|---|
| 483754 | 10/1929 | Fed. Rep. of Germany. | |
| 1267483 | 5/1968 | Fed. Rep. of Germany | 405/158 |
| 1463143 | 11/1966 | France | 405/158 |
| 1525669 | 9/1978 | United Kingdom. | |

Primary Examiner—Dennis L. Taylor
Attorney, Agent, or Firm—Bacon & Thomas

[57] ABSTRACT

The invention provides a method of assembling and installing pipes comprising disposing at least one cable between a first station and a second station; attaching and clamping a first pipe to the cable at or adjacent one of said stations; moving the pipe away from said one station with the cable; connecting a second pipe to the first pipe and attaching and clamping the second pipe to the cable at or adjacent said one station; repeating the connecting, attaching and clamping operation to provide an elongate connected sequence of pipes attached to and clamped to the cable; and drawing the cable away from said one station towards the second station to move the sequence of pipes into its desired position between the first and second stations.

15 Claims, 3 Drawing Figures

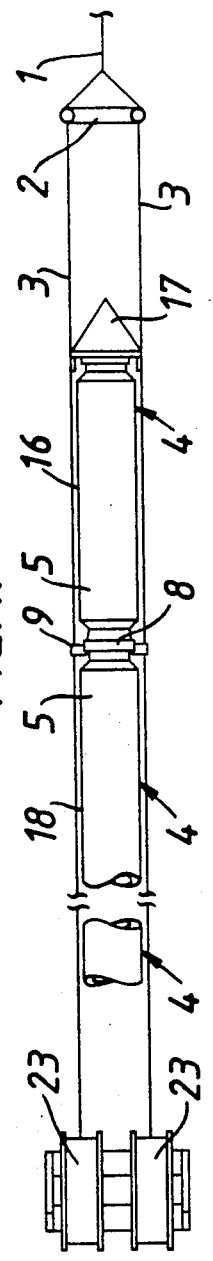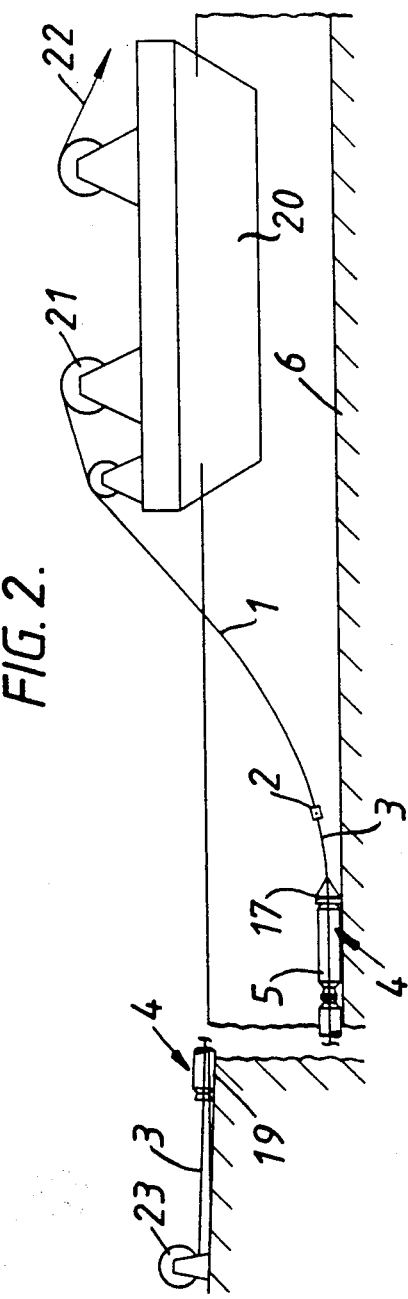

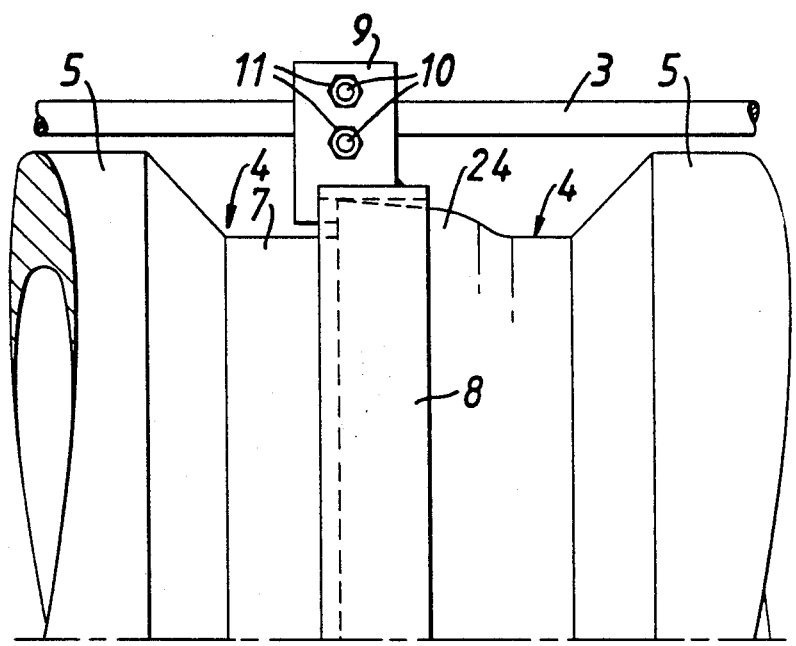

ASSEMBLY AND INSTALLATION OF PIPES

This invention relates to methods of and apparatus for the assembly and installation of pipes, particularly, but not exclusively underwater pipes. More particularly, although not exclusively, the invention is related to the assembly and installation of sea outfall pipes from sewage systems for example.

With such arrangements it has previously been proposed to weld together and concrete coat a number of discrete lengths, say 100 m, of steel pipes and locate these as parallel lines on a beach. This requires a wide flat beach, but also a considerable length to accommodate lines of pipes. Once this operation is complete the first line of pipes is towed out to sea, the second line is moved laterally and the two lines welded together. After welding and restoring the corrosion protection at the joint, the next length is towed out to sea, and so on. This previous proposal involves a number of problems. Thus a very large flat beach area is required, many months preparatory work are required, expensive supports, rollers, and hydraulic rams are required to move the pipe lengths laterally, and significant periods of interruption of towing occur whilst lengths of pipe are welded together.

It is an object of the present invention to overcome or at least substantially reduce the above mentioned problems.

According to one aspect of the invention, there is provided a method of assembling and installing pipes comprising disposing at least one cable between a first station and a second station; attaching and clamping a first pipe to the cable at or adjacent one of said stations; moving the pipe away from said one station with the cable; connecting a second pipe to the cable at or adjacent said one station; repeating the connecting, attaching and clamping operation to provide an elongate connected sequence of pipes attached to and clamped to the cable; and drawing the cable away from said one station towards the second station to move the sequence of pipes into its desired position between the first and second stations.

According to another aspect of the invention, there is provided a method of assembling and installing underwater pipes comprising disposing at least one cable between a first station and a second station; attaching and clamping a first pipe to the cable at or adjacent one of said stations; moving the pipe away from said one station with the cable; connecting a second pipe to the first pipe and attaching and clamping the second pipe to the cable at or adjacent said one station; repeating the connecting, attaching and clamping operation to provide an elongate connected sequence of pipes attached to and clamped to the cable; and drawing the cable away from said one station towards the second station to move the sequence of pipes into its desired position between the first and second stations on the water bed.

In accordance with a further aspect of the present invention there is provided apparatus for assembling and installing an underwater pipeline comprising at least one cable connected to a first station at one end and a second station at the other end; means for letting out the cable from said first station; and drawing it in the direction of said second station; and a plurality of clamps adapted to be secured to the cable and to clamp a plurality of pipes in succession thereto.

The pipes may be of cast iron, such as ductile cast iron, or of any other convenient material such as steel or polyethylene.

The pipes may be spigot and socket pipes and may be of the kind in which the socket of each pipe is provided with a sealing member providing sealing with the inserted spigot of the next adjacent pipe. The pipes may be non-locked or may be provided with their own internal or external locking means.

In one embodiment of the invention, the pipes may comprise spigot and socket pipes of the kind made and sold under the registered trade mark "Stantyte".

The pipe construction may be such as to permit deflection at the joint, so as to enable adequate bending of the pipeline as it forms to accommodate limited curvature in the cable and the water bed upon which it is laid.

In an alternative arrangement the pipes may be flanged ended and may be provided with internal seals and be connectable together across the flanges.

The pipes may be provided with weighting to counteract any natural buoyancy whilst the pipes are air filled, for example, and to hold them, once laid, firmly located on the water bed. In one embodiment of the invention the weighting may comprise a concrete sleeve adapted to fit over each pipe in the pipeline.

In one embodiment of the invention, a pair of cables are provided one on each side of the pipeline. The clamps in this case may consist of annular members arranged to surround each pipe and clamp over the two cables and be firmly secured thereto.

The clamp is conveniently of such a dimension, where a spigot and socket or flanged pipe arrangement is used, as to abut in use against the socket or flange of one pipe, so that as the cables are let out from said one station, each pipe is subjected to a lengthwise force on its socket or flange. Where spigot and socket pipes are used, these may be disposed such that as the cables are let out, the clamps surrounding the spigot of one pipe provides a lengthwise force on the socket of the next adjacent pipe. This provides full and adequate support for each pipe and maintains the integrity of each joint as the pipeline is moved with the cable.

The pipeline may be arranged to be drawn into a prepared trench in the sea bed.

The towing cables and the clamps may be treated as sacrificial and may be left in position after installation of the pipe under water. Alternatively, however, the cables and clamps may be designed to be recoverable by an underwater diver.

In one embodiment of the invention, the pipes are connected, attached and clamped at or adjacent a shore mounted station, and the cable or cables let out as required from a shore mounted winch as a vessel holding the other end of the cable or cables moves out from the shore, or as a winch carrying the other end of the cable or cables mounted on an anchored vessel is wound in. Alternatively, the pipes may be connected, attached and clamped on or adjacent a water supported barge carrying a cable let out winch, while the shore station may comprise a fixed support or wind-in winch for the other end of the cable or cables. This latter arrangement is of advantage where limited space is available at the shore station.

The operational sequence of connecting, attaching and clamping may be carried out with a step by step letting out of the cable or cables. Alternatively, the cable or cables may be let out continuously and the pipes connected, attached and clamped from a trolley moving on rails, for example, beneath the cable or cables at or adjacent the said one station. Yet again a plurality of pipes may be connected, attached and clamped to the cable or cables, which may then be let out carrying a fully prepared sequence of pipes.

In order that the invention may be more readily understood, one embodiment thereof will now be desribed by way of example with reference to the accompanying drawings in which:

FIG. 1 is a plan view of a sequence of pipes joined together by means of the invention;

FIG. 2 is an elevation of the arrangement of FIG. 1 showing the first and second stations; and FIG. 3 is an enlarged plan view of two pipes of the arrangement of FIG. 1 showing a clamp.

Referring now to the drawings there is illustrated a pipeline consisting of a sewage outfall in the the course of assembly and installation from a beach.

As can be seen a line 1 is connected to a sea barge 20 (constituting a second station), anchored via line 22 and carrying a wind-in winch 21.

This has at its end a bridle 2 having fixings for cables. From the bridle 2 two cables 3 are laid out one on each side of a sequence of pipes 4 and are connected at their far end to a let-out winch 23 mounted on the beach. Carried between the cables are the sequence of pipes, in this case "Stantyte" (Registered Trade Mark) spigot and socket, non-lockable pipes formed of ductile iron and provided with internal water-tight seals. Each pipe is provided with a concrete sleeve 5 in order to ensure an adequate weighting to retain the pipeline, when it is completed, firmly in position in a prepared trench in the sea bed 6. Around the spigot end 7 of each pipe is located a annular clamp 8 having welded side flanges 9 to which "U" bolts 10 are attached by nuts 11 after passing round the cables 3 so as to fix the clamps 8 to the cables.

It will be observed from FIG. 3 that the clamp is free to move upon the outer wall of the pipe spigot 7 it surrounds, and abut against the end of the socket 24 of the next pipe to which the spigot is connected. It is to be noted that the pipes are disposed with their socket ends located directed towards the beach, so that as the sea barge applies tension to the cables, the pipes are moved by the clamps from their socket ends so that each spigot is held firmly in location in the next adjacent socket.

In operation, the cables 3 are disposed between the winch on the barge and the winch on the beach and the first pipe 16 located and clamped within the two cables at or adjacent a first station near the beach winch 23. It is to be noted that an end cap 17 is placed over the first pipe to enable air to be retained in the pipeline and to prevent the ingress of detritus from the seabed during the laying operation. The retention of air in the pipeline during installation lightens the pipeline thereby assisting the laying operation. The cap 17 may be cone shaped as shown to assist movement of the pipeline as it is drawn across the sea bed. Once the first pipe has been located and clamped, the next pipe 18 is placed in position, provided with a clamp 8 around its spigot end, and connected to the first pipe 16, the clamp then being secured to the cables.

This operational sequence is completed step by step, until a predetermined number of pipes have been connected, with the barge winch 21 being wound in and the beach winch 23 let out to move the pipes out to sea, between each sequence, until the required length of sewer outfall pipe has been drawn across the sea bed. During this operation, the pipeline is drawn into its prepared trench in the seabed and the barge winch drags an increasingly greater length of the pipeline along the base of the trench.

Once the desired length (which may be several thousand meters) of sewer outfall pipe has been drawn out to sea, the end cap from the first pipe is removed and the whole pipe array is allowed to fill with water and rest firmly within its prepared trench. The last pipe 19 at the beach end is finally connected to the outlet sewer in normal manner, diffuser outlets secured to the first pipe or first few pipes (unless the first pipe or first few pipes already included diffuser outlets) and the outfall pipe is then in a state of completion.

The embodiment of the invention illustrated and particularly described provides an inexpensive and quick form of assembling and installing a sea outfall for sewage in which significant time savings are obtained as well as saving on support service and logistics.

While the invention has been particularly described in relation to the installation of a sewerage outfall, it has application in relation to other forms of pipes, especially underwater pipes. Thus, for example, by locating the first and second stations on opposite banks of a river, the invention may be used to assemble and install a pipeline across the river for carrying, e.g. sewerage or mains water.

We claim:

1. A method of assembling and installing pipes comprising disposing at least one cable between a first station and a second station; attaching a first pipe to the cable at or adjacent one of said stations: moving the pipe away from said one station with the cable; jointing a second pipe to the first pipe and attaching the second pipe to the cable at or adjacent said one station; repeating the jointing and attaching operation to provide an elongate connected sequence of pipes attached to the cable; and drawing the cable away from said one station towards the second station to move the sequence of pipes into its desired position between the first and second stations, the attachment of the pipes to the cable being such as to hold the pipe jointings together when the cable is drawn from one station towards the second station.

2. A method of assembling and installing underwater pipes comprising disposing at least one cable between a first station and a second station; attaching a first pipe to the cable at or adjacent one of said stations; moving the pipe away from said one station with the cable; jointing a second pipe to the first pipe and attaching the second pipe to the cable at or adjacent said one station; repeating the jointing and attaching operation to provide an elongate connected sequence of pipes attached to the cable; and drawing the cable away from said one station towards the second station to move the sequence of pipes into its desired position between the first and second stations on the water bed, the attachment of the pipes to the cable being such as to hold the pipe jointings together when the cable is drawn from one station towards the second station.

3. A method as claimed in claim 2 wherein a pair of cables are provided one on each side of the pipeline.

4. A method as claimed in claim 2 wherein the pipes are attached to the cable by clamp means comprising annular members which are placed around each pipe and clamp over the cable and are firmly secured thereto.

5. A method as claimed in claim 2 wherein the pipes are provided with additional weighting.

6. A method as claimed in claim 2 wherein the additional weighting is provided by means of a concrete sleeve to the pipe.

7. A method as claimed in claim 2 wherein the pipes are of cast iron.

8. A method as claimed in claim 2 wherein the pipes are spigot and socket pipes.

9. A method as claimed in claim 8 wherein the clamps are arranged to abut against the sockets of the pipes.

10. A method as claimed in claim 2 wherein the pipeline is arranged to be drawn into a prepared trench in the underwater bed.

11. A method as claimed in claim 2 wherein the pipes are jointed and attached to the cable at or adjacent a shore mounted station, the or each cable being let out as required from a shore mounted winch as a winch connected to the other end of the or each cable and mounted on an anchored vessel is drawn in.

12. A method as claimed in claim 2 wherein the operational sequence of jointing and attaching is carried out during a continuous letting out of the cable or cables.

13. Apparatus for assembling and installing an underwater pipeline comprising at least one cable connected to a first station at one end and a second station at the other; winch means for letting out the cable from one said station; and winch means for drawing it in the direction of the other said station; and a plurality of clamp means adapted to be secured to the cable and to attach a plurality of pipes in succession thereto, the clamp means comprising annular members adapted to be placed around each pipe with limited axial movement capability with respect thereto, the annular members clamping over the cable and being firmly securable thereto.

14. A method as claimed in claim 4 wherein the clamp means are mounted for limited movement on the pipes with respect to the longitudinal axis thereof and are arranged to apply an axial force upon the pipes holding the pipe jointings together when the cable is drawn from one station towards the second station.

15. A method of assembling and installing pipes comprising disposing towing means between a first station and a second station, attaching a first pipe to the towing means at or adjacent one of said stations, moving the pipe away from said one station with the towing means, jointing a second pipe to the first pipe and attaching the second pipe to the towing means at or adjacent said one station, repeating the jointing and attaching operation to provide an elongate connected sequence of pipes attached to the towing means, and drawing the towing means away from said one station towards the second station to move the sequence of pipes into its desired position between the first and second stations, the attachment of the pipes to the towing means being such as to hold the pipe jointings together when the towing means is drawn from one station towards the second station.

* * * * *